UNITED STATES PATENT OFFICE.

RENÉ BOHN, OF MANNHEIM, GERMANY, ASSIGNOR TO THE BADISCHE ANILIN AND SODA FABRIK, OF LUDWIGSHAFEN, GERMANY.

GREEN DYE.

SPECIFICATION forming part of Letters Patent No. 647,370, dated April 10, 1900.

Application filed November 14, 1899. Serial No. 736,972. (Specimens.)

*To all whom it may concern:*

Be it known that I, RENÉ BOHN, doctor of philosophy, a citizen of the Swiss Republic, residing at Mannheim, in the Grand Duchy of Baden and Empire of Germany, have invented new and useful Improvements in the Manufacture of Green Coloring-Matters, of which the following is a specification.

In the specifications of Patents Nos. 631,614 and 633,950, granted August 22, 1899, and September 26, 1899, respectively, I have described the production of a new oxidation product and new reduction product, respectively, from the naphthazarin intermediate product. In the German patent applications B. 24,633 and B. 24,649 of the 24th and 26th of April, 1899, respectively, it is described how the said reduction and oxidation products can be converted into the naphthazarin intermediate product in a pure and crystalline condition.

My present invention relates to the manufacture of new green coloring-matters from the said intermediate product, preferably in this pure crystallized form. My new green coloring-matters are obtained by treating the said intermediate product with an aromatic amin, with or without the use of a condensing agent or solvent. The coloring-matters are first obtained in the form insoluble in water, but can be readily sulfonated to soluble sulfoacids. These sulfoacids dye unmordanted wool from the acid-bath, giving beautiful green shades.

The following examples will serve to further illustrate my invention and the manner in which it is carried into effect and my new coloring-matters obtained.

Example 1: Mix about ten parts of the naphthazarin intermediate product hereinbefore defined with two hundred parts of glacial acetic acid and boil the mixture until a complete solution is obtained. Then add slowly about twenty parts of anilin and heat the mixture at a temperature of 100° centigrade until the solution, which is at first blue-violet, turns to a beautiful blue-green. Allow the melt to cool slowly, when the new coloring-matter usually separates out in the form of long indigo-blue needles. Collect and dry in the usual way. The coloring-matter so obtained is insoluble in water. To convert it into its sulfoacid, mix about ten parts of the dry coloring-matter thus obtained with about two hundred parts of concentrated sulfuric acid, (containing about ninety-five per cent. of $H_2SO_4$.) Heat the mixture to a temperature of 40° to 50° centigrade and maintain at this temperature for about twelve hours. Then pour the reaction product into water and precipitate the sulfoacid formed with common salt and collect in the usual way. The product so obtained is a blue-black powder readily soluble in water, giving a brilliant bluish-green solution. In the presence of caustic soda and sodium carbonate the aqueous solution is green and with concentrated sulfuric acid the product dissolves with a pure-blue solution.

Example 2: Mix together about ten parts of the naphthazarin intermediate product hereinbefore defined with about two hundred parts of glacial acetic acid and twenty parts of para-toluidin. Boil the mixture until the solution, which is at first blue-violet, becomes a beautiful blue-green color. Allow the melt to cool slowly and collect the coloring-matter that separates out. The coloring-matter so obtained is insoluble in water. It can be readily sulfonated as follows: Add about ten parts of the product to about two hundred parts of fuming sulfuric acid, (containing about twelve per cent. free $SO_3$.) Keep the acid cold—that is, below 50° centigrade—while adding the coloring-matter. Allow the mixture to stand for about one hour and then pour the reaction mass into one thousand parts of water and precipitate the coloring-matter with common salt. The product thus obtained is a greenish powder readily soluble in water, giving a bright-green color.

Example 3: Dissolve about ten parts of the naphthazarin intermediate product hereinbefore defined in about one hundred parts of anilin, and heat the mixture to 100° centigrade. Then add about forty parts of anilin hydrochlorate to the solution. The solution, which is at first blue-black in color, turns green. In about half an hour the conversion is complete. Pour the reaction product into dilute hydrochloric acid, filter, and recrystallize the precipitate from alcohol or glacial acetic acid. The coloring-matter so obtained has the same properties as the insoluble product as obtained in Example 1.

In the foregoing examples the anilin or para-toluidin can be replaced by other aromatic amins—such as, for instance, orthotoluidin, para-phenylene-diamin benzidin, and the like—and similar products are in each case obtained.

In the present application for patent I desire to claim, generically, the new green coloring-matters which can be obtained, as hereinbefore described, from the naphthazarin intermediate product and the aromatic amins, whether in the form insoluble in water or in the form of soluble sulfoacids, and, specifically, I desire to claim that coloring-matter which is obtained by the treatment of the naphthazarin intermediate product with anilin both in the unsulfonated and sulfonated form.

The coloring-matters which I desire to claim generically are characterized by the following properties: In the unsulfonated condition they are insoluble in water and caustic-soda solution, soluble in sulfuric acid, in glacial acetic acid, and anilin. In the sulfonated form it is readily soluble in water, giving green-colored solutions, soluble in caustic-soda solution, and soluble in concentrated sulfuric acid. The specific coloring-matter obtained by the use of anilin which I desire to claim is in the unsulfonated condition insoluble in caustic-soda and carbonate-of-soda solution, insoluble in water, soluble in concentrated sulfuric acid, giving green-blue solutions, in anilin giving a pure-green solution, and in glacial acetic acid giving greenish-blue solution.

Now what I claim is—

1. A new green coloring-matter which can be obtained from the naphthazarin intermediate product and an aromatic amin which in the unsulfonated form are insoluble in water and acetic-acid solution, soluble in sulfuric acid, in glacial acetic acid and anilin and in the sulfonated form are readily soluble in water giving a green-colored solution, soluble in caustic-soda solution and soluble in concentrated sulfuric acid, all substantially as described.

2. A new green coloring-matter which can be obtained from the naphthazarin intermediate product and anilin and in the unsulfonated form is insoluble in water and in caustic-soda solution, soluble in concentrated sulfuric acid giving a green-blue solution and in anilin a pure-green solution and which in the sulfonated form is soluble in water giving a brilliant bluish-green solution which turns green in the presence of caustic soda and sodium-carbonate and soluble in concentrated sulfuric acid giving a brilliant blue solution, all substantially as described.

In testimony whereof I have hereunto set my hand in the presence of two subscribing witnesses.

RENÉ BOHN.

Witnesses:
OSCAR BALLY,
ERNEST F. EHRHARDT.